Oct. 31, 1967    W. H. QUICK    3,349,628
STABLE REFERENCE APPARATUS
Filed Jan. 4, 1965    4 Sheets-Sheet 1

INVENTOR.
WILLIAM H. QUICK
BY *Vincent H. Cleary*
ATTORNEY

INVENTOR.
WILLIAM H. QUICK
BY
ATTORNEY

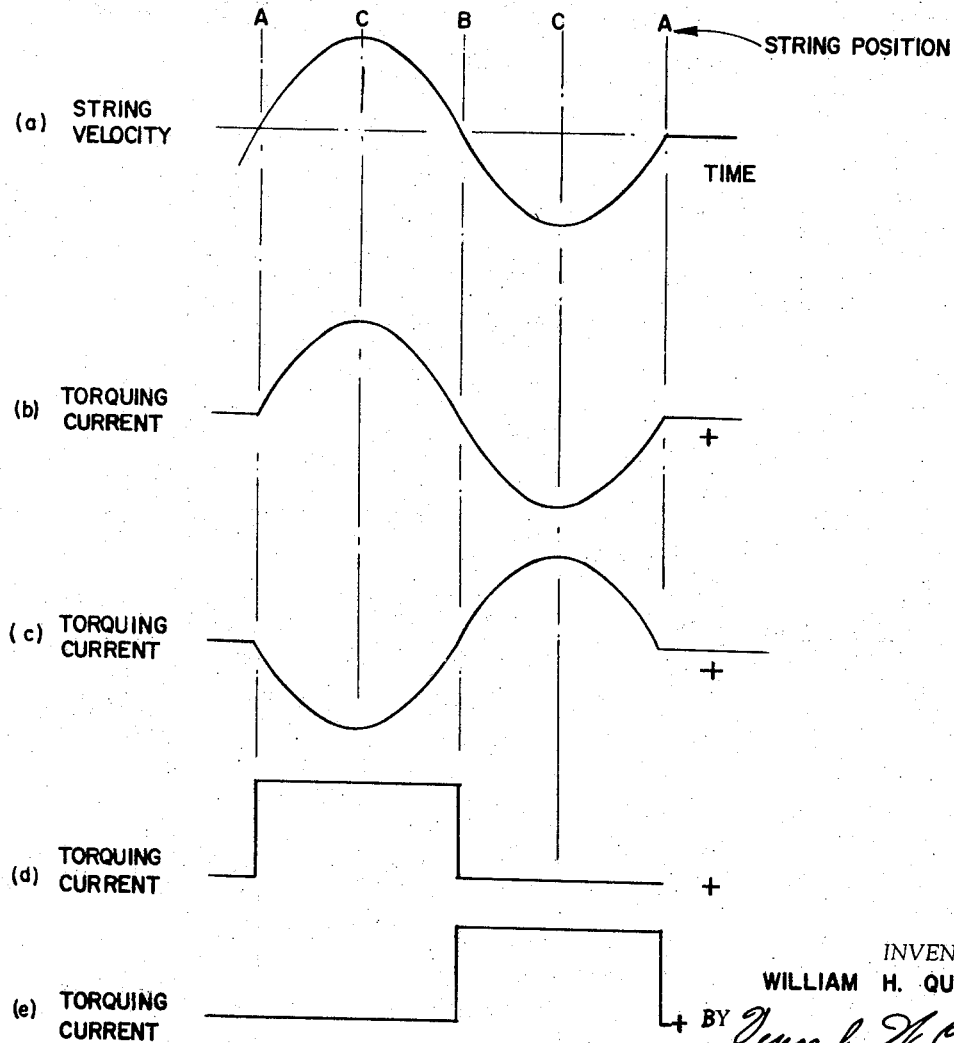

United States Patent Office 3,349,628
Patented Oct. 31, 1967

3,349,628
STABLE REFERENCE APPARATUS
William H. Quick, La Mirada, Calif., assignor to North American Aviation, Inc.
Filed Jan. 4, 1965, Ser. No. 422,995
8 Claims. (Cl. 73—505)

This invention relates to an inertially stable reference apparatus and more particularly to a gyroscopic type device employing a string type oscillatory element instead of the commonly employed rotary element.

In United States Patent No. 3,106,847, dated Oct. 15, 1964, entitled, Gyroscopic Apparatus, in the name of W. D. Mullins, Jr., et al., there is disclosed a gyroscopic type apparatus employing a string type vibrating element. This type of gyro avoids many of the problems encountered with conventional gyros by eliminating precision rotor spin bearings and low coercion output bearings. In addition, it can be constructed with temperature and variation effects minimized to a greater extent than possible with conventional spinning rotor gyros.

In the present invention, the torquing means employed to accurately torque or rotate the plane of vibration of the string gyro may be of the type disclosed in the above patent. In this of torquing means, a signal is generated directly from the vibration of the string to provide a signal which has the same frequency and amplitude as the vibration of the string. This signal is applied to the string in phase with the vibration of the string. This signal creates a magnetic field which reacts with the magnetic field passing through the plane of vibration to provide a torque to rotate the plane of vibration of the string in a predetermined direction.

It is therefore, an object of the invention to provide an accurate torquing means for a vibrating string type gyroscopic apparatus.

Another object of the invention is the provision of an efficient torquing circuit and indicating means for torquing the vibrating plane of a string type gyroscopic apparatus.

Other objects of the invention will become apparent from the following description taken in conjunction with the following drawings in which:

FIG. 4 illustrates a cross-sectional view taken along lines 4—4 of FIG. 1; and

FIG. 5 illustrates waveforms useful in explaining the invention.

Figure 1:
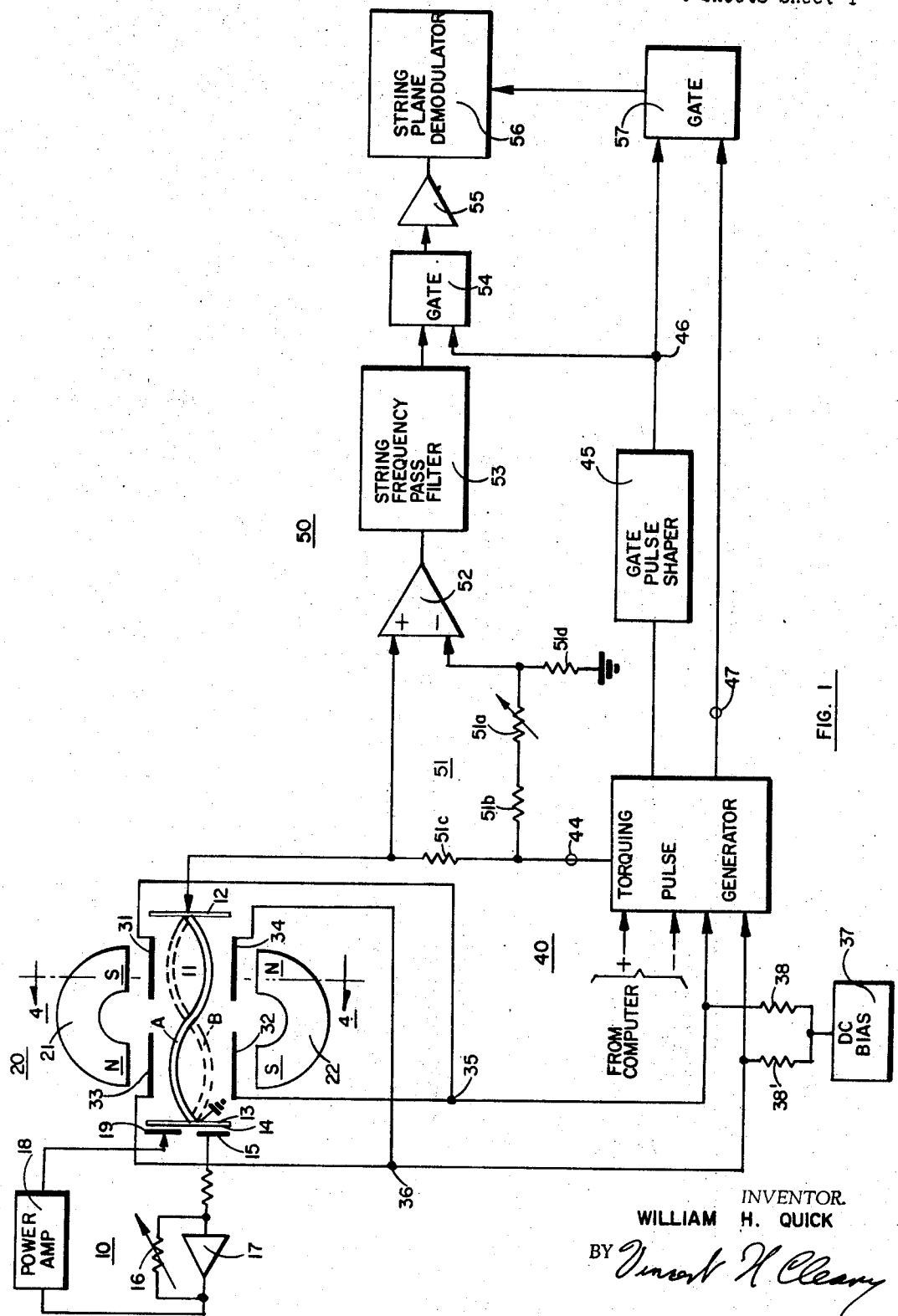
FIG. 1 illustrates an inertially stable reference apparatus partially in block form embodying the invention.

Referring to FIG. 1, the means for vibrating the string 11 is similar to the driving mechanism illustrated in the above identified patent and is identified as numeral 10 in FIG. 1.

With reference to FIG. 1, which illustrates the functional interrelation of the electrical, mechanical and magnetic aspects of a preferred embodiment of the invention, the disclosed vibrating string gyro comprises a fine gold-plated quartz fiber 11 which is stretched to the limit of practicable tension and secured at two points thereof a pair of vibratory end bars or diaphragms 12 and 13 which are fixedly secured to each other in the illustrated mutually spaced relationship by means to be described more particularly hereinafter. The string or fiber 11 is preferably of circular cross-section and may be on the order of one to three mils in diameter, having a length of one to two inches. The diaphragms 12 and 13, both of which are formed integrally with a quartz supporting body to be described below, may be of a thickness on the order of 60 mils and are caused to vibrate in opposition so as to move the ends of the string precisely axially, that is, both diaphragms move inwardly together and outwardly together.

The vibrating system, thus formed, is dynamically balanced so that the resulting Q is high. A high degree of symmetry of the vibrating diaphragms 12, 13 is employed to insure that the motion of the string end points is solely axial. For purposes of maintaining stability of the reference plane of a device of this nature, it is desirable that the variation in tension of the string during its vibration be held to a minimum. For example, despite all precautions, some transverse vibration of the support will be imparted to the string support points in such a way as to produce an elliptical vibratory string path. With such an elliptical path, a variation in tension of the string due to nonlinearity will give rise to undesired precession, that is, rotation of the plane of vibration. By proper choice of initial tension and the dimensions determining frequency, and by controlling the amplitude of the end motion, the tension variation can be greatly reduced. The amplitude of the end motion is governed by the operation of the longitudinal driving system which will be described below, together with the dimensions of the vibratory diaphragms. The thickness and distance between supporting points of such diaphragms will govern the resonant frequency thereof at which they are driven. The frequency of the resonant drive is twice that of the string. The string mass per unit length together with the tension is appropriately adjusted for the desired amplitude length ratio. Such a ratio is the ratio of the amplitude of transverse motion of the string to the length of string between support points. By means of a slight trimming of the driving oscillator amplitude, a minimum tension variation condition will be achieved with the amplitude length ratio very close to the desired value.

The resonant system comprising the quartz string vibrating bars or diaphragms 12 and 13, together with the body which forms the support therefor, may be sealed in a case evacuated to a degree that the Q of the resonant bars or diaphragms is exceedingly high, on the order of 100,000, such that small driving forces are required to maintain oscillation. With the small driving force required, vibration can be imparted to the resonant system by applying an A-C voltage across the capacitor gap to provide an electrostatic drive.

The electrostatic drive comprises a closed loop oscillator including an electrode 14 plated on or otherwise secured to the outer surface of vibratory diaphragm 13 and a capacitive pickoff plate 15 secured to the case in which the instrument is to be mounted. Pickoff device 14, 15 provides a signal indicating amplitude and phase of the driving motion which is amplified by amplifier 17, the gain of which is controlled by a thermistor 16 in its feedback circuit. The signal from amplifier 17 is applied to a power amplifier 18 whose output is fed to an electrostatic drive comprising the electrode 14 plated on the diaphragm 13 and a second plated electrode 19 fixed to the instrument case. A D-C bias voltage from a source, not shown, is applied to electrode 14 in order to excite the pickoff and forcing sections, thereby greatly enhancing the efficiency of the A-C voltage in driving the resonator. Thus, it will be seen that there is provided a feedback oscillator including the vibratory diaphragm 13 as a frequency controlling element thereof which applies a driving voltage at twice the string frequency to the diaphragm 13 across the gap between electrodes 14 and 19.

Thermistor 16, having a resistance which decreases with temperature, will operate normally to limit the signal flowing in the driving oscillator circuit; and thus, tend to maintain a constant amplitude of vibration. This thermistor has a second significant function which arises by reason of the desire for operating the string in the desired constant tension condition. For operation in such a constant tension condition difficulties are normally encountered in starting vibration when an end drive is employed. For this reason, the thermistor 16 is utilized to cause the starting end motion amplitude to be substantially greater, on the order of approximately 100 percent greater, than the normal operating amplitude. The increased starting amplitude is caused by the thermal characteristics of the thermistor 16 which when cold has a relatively high resistance, thereby allowing a larger signal to flow through the driving oscillator circuit. Shortly after the vibration is started and the thermistor heats up, its resistance decreases thereby decreasing the gain of amplifier 17 resulting in a decrease of the signal flow in the driving oscillator circuit to a point where it maintains a steady level.

As shown in FIG. 1, the embodiment illustrated therein employs a vibrating string 11 which vibrates in its second mode. To achieve this, it is necessary simply to appropriately vary the relation between string length and driving frequency. That is, to change from a first mode to a second mode drive for a given driving frequency, the string length would be doubled. Conversely, for a given length string, the driving frequency would be doubled to change from first mode oscillations to second mode oscillations. As will be understood, the plane of vibration tends to remain fixed in space.

In the embodiment illustrated in FIG. 1, a magnetic assembly 20 is employed which provides two oppositely directed flux paths which pass through corresponding halves of the string 11. These flux paths are provided as shown in FIG. 1 by a U-shaped magnet 21 and a U-shaped magnet 22 which are poled as indicated. A pickoff transducer is employed having pickoff plates 31 and 32 as well as 33 and 34. Pickoff plates 31 and 34 are employed on opposite sides of the right hand portion of string 11; whereas, pickoff plates 32 and 33 are employed on opposite sides of the left hand section of string 11 as shown in FIG. 1. Pickoff plates 31 and 32 are in the same position relative to string 11, and pickoff plates 33 and 34 are also in the same position relative to string 11. To provide an accurate signal indicative of the displacement of string 11, plates 31 and 32 are electrically connected together as are pickoff plates 33 and 34. The common connection 35 of plates 31 and 32 and the common connection 36 of plates 33 and 34 are connected to a torquing pulse generator 40 shown in block form in FIG. 1. An output of torquing pulse generator 40 is derived at terminal 44 where there is provided a sine wave signal which is applied through vibrating string 11 to ground. This current creates a magnetic field which coacts with the magnetic field created by the magnetic assembly 20 to effect the torquing of the plane of vibration of string 11. The torquing current in one embodiment has a time duration of one cycle of vibration of the string 11. As shown in FIG. 1 and FIG. 4, symbolically, the string 11 will vibrate from a neutral or central position C to a first position A shown in FIG. 4, back to position C and then to a second position B shown in FIG. 1 and FIG. 4 and back to the central position C. The capacitive plates 31 and 34 are omitted from FIG. 4. With the current going into the paper as shown in position A and out of the paper in position B as shown in FIG. 4, a clockwise forme $F_1$ will thereby be effected to rotate the plane of vibration of the string. If the current through the string is in the opposite direction from that shown in FIG. 4, the force on the string vibrating plane due to this current will be in an opposite direction, in a counter clockwise direction. As will be explained below, it has been found that the torquing current for one direction should be in phase with the string velocity so as to provide a torque current such as shown in FIG. 5b. In order to produce a torquing in the opposite direction, the torquing current would be 180 degrees out of phase with the string velocity as shown in FIG. 5c. It will be noted that FIG. 5a illustrates the velocity of the string during the string positions indicated in FIG. 4. It has further been found that utilizing an alternating current signal which is a function of the vibration of the string provides accurate torquing of the string plane.

Figure 2:
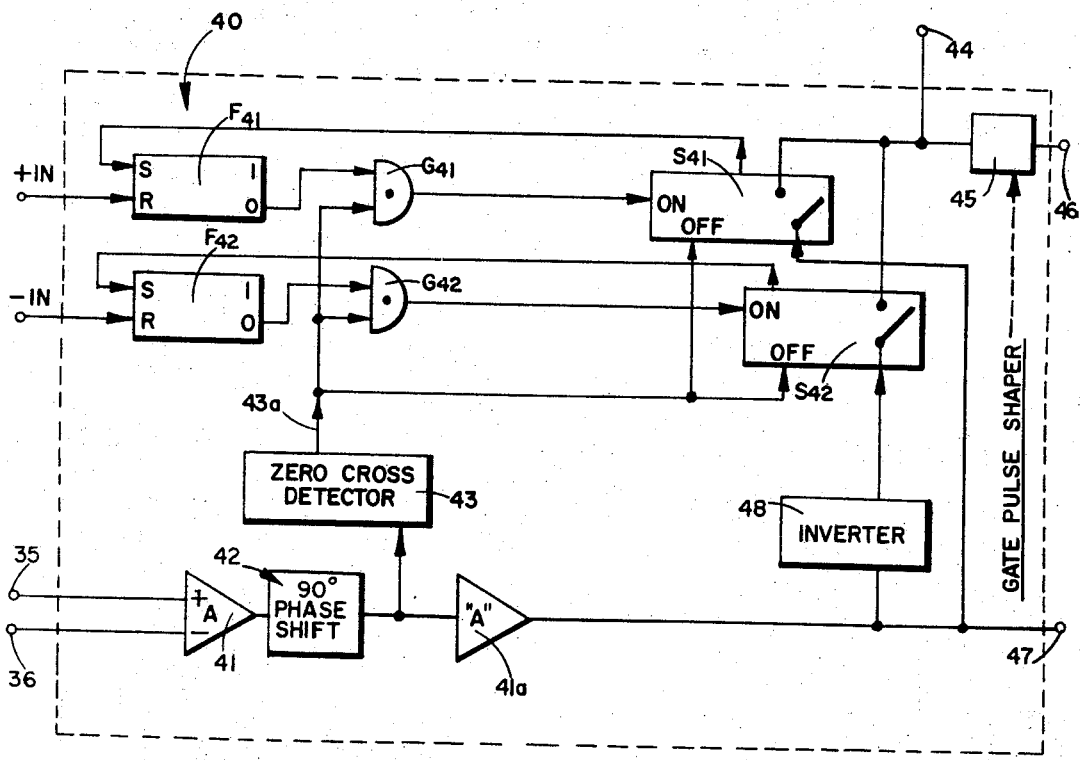
FIG. 2 illustrates a schematic diagram of a torquing pulse generator embodying the invention.

In order to achieve this precision type torquing of the vibrating string element, the torquing pulse generator 40 includes, as shown in FIG. 2, two RS flip-flops $F_{41}$ and $F_{42}$ which receive a signal from the computer or other direction means to torque the plane of vibration of the string 11. An input from the computer of flip-flop $F_{41}$ will torque the plane of vibration of the string 11 in one direction while an input to the flip-flop $F_{42}$ will torque the plane of vibration of the string in an opposite rotary direction.

The pickoff reference points 35 and 36 are connected respectively through high resistances 38 and 38' to a D-C bias source 37. As described in the above patent, this provides a constant charge between the pickoff plates 31 through 34 and the string 11. This enables an A-C signal, which varies as a function of the displacement of the string to be developed at terminals 35 and 36.

The reference points 35 and 36 are connected to a differential amplifier 41 which provides an output signal which is the difference between the A-C pickoff signals at points 35 and 36. Thus, this provides an output which in effect is an accurate or/and average output which varies as a function of the vibration of the string 11. Since, as described above, the torquing signal should vary as a function of the velocity of the string, the output of amplifier 41 is passed through a 90 degree phase shifting network 42. More specifically, the signal from the amplifier 41 is in phase with the displacement of string 11. Therefore, a 90 degree phase shift is necessary to provide a signal which is in phase with the velocity of the string 11. The output of network 42 is fed to a zero-cross detector 43 having an output terminal 43a. When, and only when, the signal from phase shifting network 42 goes from negative to positive, there is a pulse provided on output terminal 43a of zero-cross detector 43.

Output terminal 43a is connected to AND gates $G_{41}$ and $G_{42}$. The output 43a is also connected to the off inputs of gates or switches $S_{41}$ and $S_{42}$.

The flip-flops $F_{41}$ and $F_{42}$ are of the so called RS type. If a one is applied to the R input of either one of these flip-flops from the computer, they will be switched to a false condition so as to apply a one to gates $G_{41}$ or $G_{42}$ respectively. That is, when an input is applied to flip-flop $F_{41}$ from the computer, a one will be applied to the AND gate $G_{41}$. Likewise, if a one is applied to RS flip-flop $F_{42}$, a one will be applied to AND gate $G_{42}$.

AND gate $G_{41}$ is connected to the on input of switch $S_{41}$ and AND gate $G_{42}$ is connected to the on input of switch $S_{42}$. When a one is applied to the R input of $F_{41}$, the switch $S_{41}$ will be turned on at the next negative to positive zero-crossing of the output of network 42. The output of amplifier 41a is connected through switch $S_{41}$ so that under these conditions the output of amplifier 41a will pass through $S_{41}$ and appear at output terminal 44. Thus, a torquing current similar to that shown in FIG. 5(b) will commence at the output terminal 44. When the next negative to positive zero-crossing occurs at output terminal 43a, the switch $S_{41}$ will be turned off to produce exactly a full cycle of torquing current as shown in FIG. 5(b). The switch $S_{41}$ is connected back to the S input of flip-flop $F_{41}$ so that as soon as the switch $S_{41}$ is opened by gate $G_{41}$ the flip-flop $F_{41}$ will be restored to a true condition such as illustrated in the drawings with a zero connected to the gate $G_{41}$.

If a one is provided to the R input of $F_{42}$ from the computer, a one output will be applied to the gate $G_{42}$. This output will be maintained there until the next negative to positive zero-crossing of the output of network 42 at which time the gate $G_{42}$ will turn on switch $S_{42}$. At the next negative to positive zero-crossing, the output terminal 43a will turn off the switch $S_{42}$ so as to provide an output torquing current on terminal 44 such as illustrated in FIG. 5(c). This signal from $S_{42}$ is 180 degrees out of phase with the signal from $S_{41}$ due to inverter 48. Additionally, as soon as the switch $S_{42}$ is turned on, the flip-flop $F_{42}$ receives a signal at its set input to provide a true output or a zero input into gate $G_{42}$ so as to recondition the system for the next computer command.

As stated above, terminal 43a is connected to gates $G_{41}$ and $G_{42}$ as well as the off inputs of $S_{41}$ and $S_{42}$. Appropriate means is employed such as a delay in gates $G_{41}$ and $G_{42}$ so that the switches $S_{41}$ and $S_{42}$ will operate initially only on signal from gates $G_{41}$ and $G_{42}$ not to the simultaneously occurring signal applied to the off inputs of $S_{41}$ and $S_{42}$. Thus, it is seen that the torquing pulse generator 40 provides the signals shown in FIGS. 5(b) and 5(c) to rotate the vibrating plane of the string 11. As shown in FIG. 1, the output terminal 44 is connected through resistor 51c to string 11 so that the waveform shown in FIG. 5(b) or FIG. 5(c) can be selectively applied to conducting string 11.

The readout of the above torquing is accomplished by a readout circuit 50 having a voltage divider network 51 consisting of resistors 51a, 51b, 51c and 51d which provides signals to the differential amplifier 52. Amplifier 52 has its differential output applied to a filter 53 which passes or is tuned to the vibrating frequency of the string 11. The output of the filter 53 is applied to AND gate 54. The gate 54 receives a second input on terminal 46 from a pulse shaper 45. A gate 57 is connected to terminal 47 at one input so as to receive a signal which is a function of and in phase with the velocity of vibration of the string 11. The second input of the gate 57 is connected to pulse shaper 45.

The outputs of switches $S_{41}$ and $S_{42}$ are connected directly or through an OR gate (not shown) to terminal 46 via pulse shaper 45. The output of the pulse shaper 45 is a pulse which is unipolar that starts when a torquing pulse such as shown in FIG. 5(b) and FIG. 5(c) starts and ends slightly after such pulse ends. Thus, at any time that there is a torquing pulse such as shown in FIG. 5, there will be the output of amplifier 41a being applied through gate 57 to turn off gate 57 and prevent any string frequency signal from terminal 47 reaching demodulator 56. Likewise, the pulse from shaper 45 will be effective to simultaneously turn off gate 54 and prevent the torquing current passing through gate 54 to demodulator 56.

By such a pickoff or readout circuit 50, the resistive network 51 results in a canceling signal being fed to the negative input of the amplifier 52. Under normal circumstances, the voltage associated with the current is overwhelmingly larger than the string plane angle signal which must be detected at the same electrical contact. For this reason, care must be taken to prevent cross-talk in this time sharing circuit. Shown here is the quadruple precaution against cross-talk consisting of (1) a canceling signal being fed to the negative input of the string-plane preamp, with a suitable trimming pot, (2) a string-frequency pass filter, (3) a blanking gate at some intermediate level of amplification, and (4) a gate on the demodulator reference line. With a switching demodulator, plus a peak-hold filter, the interruption of the switching signal for one cycle would not affect the output. With a switching demodulator plus an averaging filter (preferred for better noise rejection) the output would be affected. Thus when torquing occurs, demodulator 56 will be turned off so as to indicate the amount of torquing. Further, the demodulator can also be utilized to indicate the angular position of the string plane.

Figure 3:
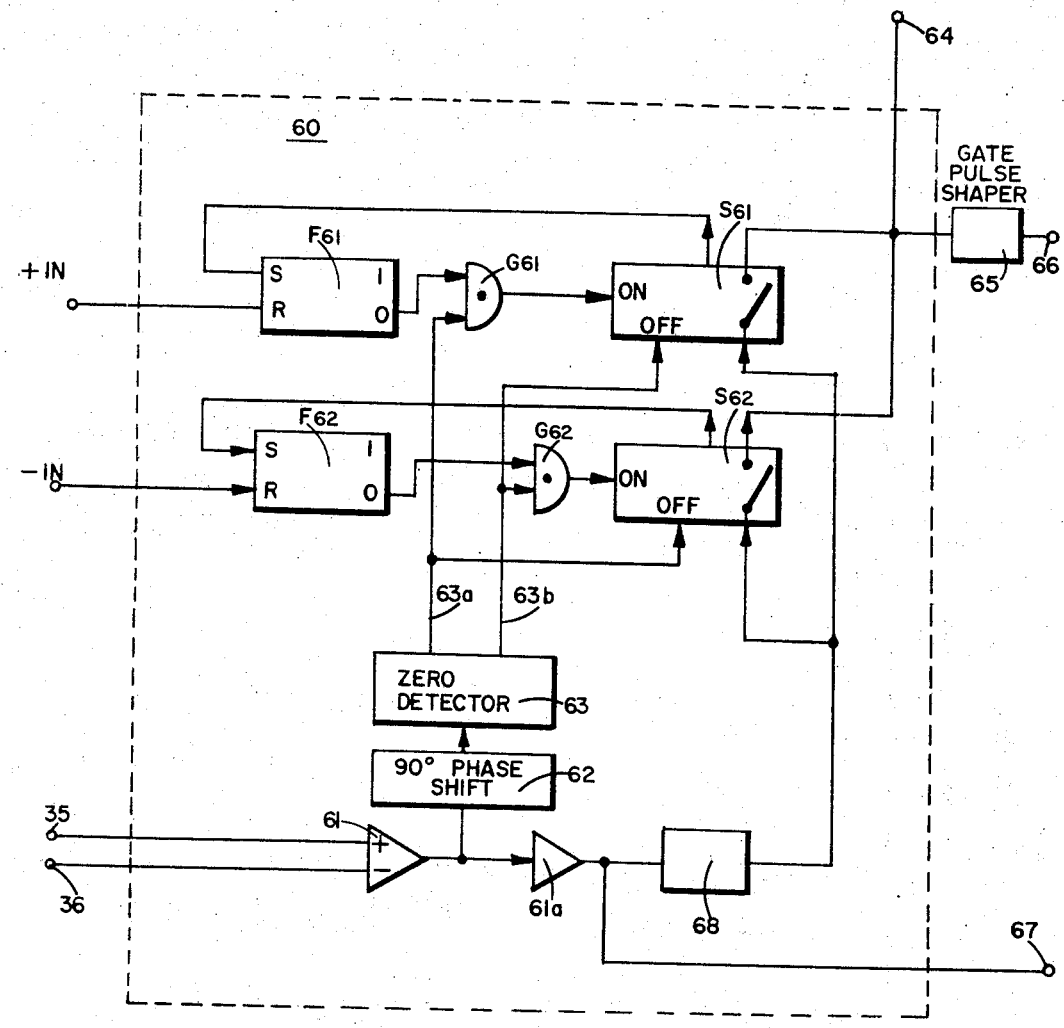
FIG. 3 illustrates another torquing pulse generator embodying the invention.

Torquing and more specifically direction torquing of the plane of vibration of the string can be accomplished by utilizing a square wave pulse of a predetermined phase and frequency. Thus as shown in FIG. 5(d), a torquing pulse having a time width of a half cycle of string vibration and in phase with the string velocity of string 11 can provide rotation of the plane of vibration of string 11 in a first predetermined rotary direction. The pulse shown in FIG. 5(e) will provide rotation of the plane of vibration in an opposite direction. A torquing pulse generator 60 is illustrated in FIG. 3. It will provide such suitable torquing signals. The terminals 35 and 36 are connected to the generator 60 as well as the computer connections as shown. The pickoff signals 35 and 36 are applied to a differential amplifier 61 which then provides an output signal which varies as a function of the pickoff signals on references 35 and 36. This provides an accurate alternating current signal which varies as a function of the displacement of the string 11 during vibration. The output of amplifier 61 is fed through a 90 degree phase shifting network 62 so as to provide a signal which varies as and is in phase with the velocity of the vibrating string 11. This signal is applied to a zero crossing detector 63 having outputs 63a and 63b. The detector 63 will present a pulse on output terminal 63a when and only when the signal from network 62 goes from negative to positive and on output terminal 63b when and only when this signal goes from positive to negative. Flip-flops $F_{61}$ and $F_{62}$ are similar in operations to flip-flops $F_{41}$ and $F_{42}$. These are so called RS flip-flops. When there is a one at the S input, an output as indicated occurs so that its only attached (lower) output lead would be zero. When there is a one at the R input, the only output lead connected would be one. Flip-flop $F_{61}$ is connected to AND gate $G_{61}$ as is output terminal 63a. Flip-flop $F_{62}$ has its lower output connected to AND gate $G_{62}$ which has a second input connected to output terminal 63b. AND gate $G_{61}$ is connected to an "on" input of a switch $S_{61}$ and AND gate $G_{62}$ is connected to an "on" input to a switch $S_{62}$. Output terminal 63a is connected to an off input of switch $S_{62}$ and output terminal 63b is connected to an off input of switch $S_{61}$.

The amplifier 61 is connected to another precision gain amplifier 61a, the output of which is connected to a precision rectifier and filter 68 as well as an output terminal 67 which operates as a demodulator reference similar to output reference 47. The precision rectifier 68 converts a continuous alternating input thereto to a square wave output. The output of this rectifier 68 is connected to the switches $S_{61}$ and $S_{62}$. When the gates $S_{61}$ or $S_{62}$ are open or on the square wave output of precision rectifier 68 will pass to the output terminal 64.

When a computer one is applied to the R input of $F_{61}$, the gate $G_{61}$ will turn on switch $S_{61}$ at the next positive going zero crossing being applied to $G_{61}$. At the next negative going zero crossing, switch $S_{61}$ will be turned off by the pulse from output terminal 63b. Thus, during this divided time period when switch $S_{61}$ is on, a square wave pulse with an amplitude that varies as a function of the vibration of the string will be passed to the output terminal 64. The output terminal 64 would be connected similarly to output terminal 44 so as to provide a torquing current through vibrating string 11.

The flip-flop $F_{61}$ is returned to its true condition as soon as the switch $S_{61}$ is turned on by gate $G_{61}$ by an output from $S_{61}$ being connected to the S input of $F_{61}$. This reconditions the RS flip-flop $F_{61}$ for another computer input.

When a one is presented to the R input of $F_{62}$, the AND gate $G_{62}$ will turn on switch $S_{62}$ at the next negative going zero crossing pulse from detector 63. Simultaneously an output of $S_{62}$ will render $F_{62}$ true by an output connected to its S input. When the switch $S_{62}$ is thus turned on, a torquing period commences which will be terminated by the switch $S_{62}$ being turned off at the next positive going zero crossing by a pulse being applied from output terminal 63a to the off input of switch $S_{62}$. Thus by selectively applying computer pulse inputs to $F_{61}$ and $F_{62}$, the signals shown in FIG. 5(d) and FIG. 5(e) are applied to string 11 to selectively torque its plane of vibration in one rotary direction or the other. These pulses, which have a time width equal to 180 degrees of vibration of the string 11, will be in phase or out of phase with the velocity of the string and will have an amplitude proportionate to the vibrations (displacement) of the string.

During any torquing period such as illustrated in FIGS. 5(d) and 5(e), these pulses will be applied to a gate pulse shaper 65 similar to shaper 45 described above and thence to an output terminal 66. Utilizing the torquing pulse generator 60, output terminal 64 will be connected similarly to output terminal 44. Output terminal 66 will be connected similar to 46 and output terminal 67 will be connected similar to 47. Thus, the connections of the torquing pulse generator to the readout 50 is the same as their torquing pulse generator 40. Likewise, the operation will be the same in passing the torquing signals and demodulating them.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A spatial direction indicator comprising a support means, a vibratory string mounted between two points of said support means, means for effecting vibration of said string at a predetermined frequency in a vibratory plane, torquing means for rotating the vibratory plane comprising sensing means providing a signal current which varies as a function of the vibration of said string, magnetic means providing a magnetic field adjacent said string, and means applying said signal current through said string to effect rotation of said vibratory plane.

2. A spatial direction indicator comprising support means, a string mounted between two points of said support means, means for effecting vibration of said string at a predetermined frequency in a vibratory plane, magnetic means providing a magnetic field through said string, torquing means for rotating the vibratory plane comprising sensing means sensing the vibrations of said string to provide a signal current having an amplitude which varies as a function of the vibrations of said string and having a predetermined time duration which is equal to $N$ times $P/2$ where N equals any whole integer and P is the period of vibration of said string, and means applying said signal current through said string to effect rotation.

3. A spatial direction indicator comprising support means, a conductive vibratory string mounted between two points of said support means, means for effecting vibration of said string at a predetermined frequency in a vibratory plane, magnetic means providing a magnetic field through said string, torquing means for rotating the vibratory plane comprising sensing means sensing the string vibrations to provide an alternating current signal having the same frequency as the vibrations of said string and an amplitude which is a function of the amplitude of vibration of said string, and means applying said signal current through said string to effect rotation of said vibratory plane.

4. A spatial direction indicator comprising support means, a string mounted between two points of said support means, means for effecting vibration of said string at a predetermined frequency in a vibratory plane, magnetic means providing a magnetic field through said string, sensing means sensing the string vibrations to provide a square wave current source having an amplitude which is a function of the amplitude of vibration of said string and having a time width equal to half the period of vibration of said string and means applying said square wave pulse current through said string to effect rotation of said vibratory plane.

5. A spatial direction indicator comprising support means, a string mounted between two points of said support means, means for effecting vibration of said string at a predetermined frequency in a vibratory plane, magnetic means providing a magnetic field through said string, torquing means for rotating the plane of vibration of said string comprising sensing means sensing the string vibrations to provide a first alternating current signal having the same frequency as the vibrations of said string and an amplitude which varies as a function of and in phase with the velocity of said string, means applying said first signal to said string to effect rotation of said vibratory plane in a first direction, means generating a second alternating current signal having the same frequency as the vibration of said string and an amplitude which varies as a function of and 180° out of phase with the velocity of said string and means applying said second signal to said string to effect rotation of said vibratory plane in an opposite direction.

6. A spatial direction indicator comprising support means, a conductive string mounted between two points of said support means, means for effecting vibration of said string at a predetermined frequency in a vibratory plane, magnetic means providing a magnetic field through said string, torquing means for rotating the plane of vibration of said string comprising sensing means sensing the string vibrations to provide a square wave signal having an amplitude which is a function of the movement of said string and in phase with the velocity of said string and means applying said signal across said string to effect rotation of the plane of vibration of said string.

7. A spatial direction indicator comprising support means, a string mounted between two points of said support means, means for effecting vibration of said string at a predetermined frequency in a vibratory plane, magnetic means providing a magnetic field through said string, torquing means for rotating the vibratory plane of said string comprising sensing means sensing the string vibrations to provide an alternating current signal having the same frequency as and 90° out of phase with the vibrations of said string with an amplitude which varies as a function of the amplitude of vibration of said string, said signal current having a time duration of one period of vibration of said string and means applying said signal current to said string to effect rotation of said vibratory plane.

8. A spatial direction indicator comprising support means, a string mounted between two points of said support means, means for effecting vibration of said string at a predetermined frequency in a vibratory plane, magnetic means providing a magnetic field through said string, torquing means for rotating the vibratory plane of said string comprising sensing means sensing the string vibrations to provide a signal current which varies as a function of the movement of said string to thereby provide an alternating current signal having the same frequency as an 90 degrees out of phase with the vibrations of said string, with an amplitude which varies as a function of the amplitude of vibration of said string, and means applying said signal current across both ends of said string to effect rotation of said vibratory plane.

References Cited

UNITED STATES PATENTS 3,106,847   10/1963   Mullins et al. _____ 73—505

JAMES J. GILL, *Primary Examiner.*